United States Patent
Seeger et al.

(10) Patent No.: US 10,975,254 B2
(45) Date of Patent: Apr. 13, 2021

(54) LIQUID COATING COMPOSITIONS FOR USE IN METHODS FOR FORMING A SUPERHYDROPHOBIC, SUPEROLEOPHOBIC OR SUPERAMPHIPHOBIC LAYER

(71) Applicants: Silana GmbH, Zollikon (CH); Universitat Zurich, Zurich (CH)

(72) Inventors: Stefan Seeger, Zollikon (CH); Sandro Olveira, Zurich (CH); Zonglin Chu, Zurich (CH)

(73) Assignee: Silana GmbH, Zollikon (CH)

( * ) Notice: Subject to any disclaimer, the term of this patent is extended or adjusted under 35 U.S.C. 154(b) by 76 days.

(21) Appl. No.: 15/323,085

(22) PCT Filed: Jul. 2, 2015

(86) PCT No.: PCT/EP2015/065140
§ 371 (c)(1),
(2) Date: Dec. 29, 2016

(87) PCT Pub. No.: WO2016/001377
PCT Pub. Date: Jan. 7, 2016

(65) Prior Publication Data
US 2017/0152388 A1      Jun. 1, 2017

(30) Foreign Application Priority Data

Jul. 2, 2014   (EP) .................................. 14175443

(51) Int. Cl.
*C09D 7/65*      (2018.01)
*B05D 5/08*      (2006.01)
(Continued)

(52) U.S. Cl.
CPC ............... *C09D 7/65* (2018.01); *B05D 1/04* (2013.01); *B05D 1/18* (2013.01); *B05D 1/28* (2013.01);
(Continued)

(58) Field of Classification Search
CPC ... B05D 1/04; B05D 1/18; B05D 1/28; B05D 2602/00; B05D 3/067; B05D 5/08; C09D 5/1662; C09D 7/70; C23C 4/12
See application file for complete search history.

(56) References Cited

U.S. PATENT DOCUMENTS 7,914,897 B2 *   3/2011   Zimmermann ..........  C09D 4/00
                                                    428/447
8,067,065 B2    11/2011   McCarthy et al.
2006/0240218 A1 * 10/2006 Parce ..................... B82Y 30/00
                                                    428/98

FOREIGN PATENT DOCUMENTS

EP          1644450       8/2015
WO     WO-2014035742 A2 *  3/2014   ....... H01L 31/02366

OTHER PUBLICATIONS

Chen et al: "Perfectly Hydrophobic Silicone Nanofiber Coatings: Preparation from methyltrialkoxysilanes and Use as Water Collecting Substrate", Journal of Physical Chemistry C, May 14, 2009, vol. 113, No. 19, pp. 8350-8356.*

(Continued)

*Primary Examiner* — Satya B Sastri
(74) *Attorney, Agent, or Firm* — Patent Law Works, LLP

(57) ABSTRACT

A method for forming a superhydrophobic, superoleophobic or superamphiphobic layer and imparting said properties on a surface, wherein dispersed silicone nanoparticles are formed by polymerization of at least one compound of formula I $$R_a Si(R_1)_n (X_1)_{3-n} \qquad (I)$$

(Continued)

in an aprotic solvent comprising 5 to 500 ppm water and wherein Ra is a straight-chain or branched C(1-24) alkyl or alkenyl group, an aromatic group which is linked by a single covalent bond or linked by a straight-chain or branched alkylene unit having 1 to 8 carbon atoms, to the Si-atom, R1 a straight chain or a branched hydrocarbon radical having 1 to 6 carbon atoms, X1 is a hydrolysable group, which is one or more of a halogen or an alkoxy group, and n is 0 or 1.

13 Claims, 2 Drawing Sheets

(51) Int. Cl.
   C09D 7/40      (2018.01)
   B05D 1/04      (2006.01)
   B05D 1/18      (2006.01)
   B05D 1/28      (2006.01)
   B05D 3/06      (2006.01)
   C09D 5/16      (2006.01)
   C23C 4/12      (2016.01)

(52) U.S. Cl.
   CPC ............... *B05D 3/067* (2013.01); *B05D 5/08* (2013.01); *C09D 5/1662* (2013.01); *C09D 7/70* (2018.01); *C23C 4/12* (2013.01); *B05D 2602/00* (2013.01)

(56) References Cited

OTHER PUBLICATIONS

Zhang et al: "Superoleophobic Coatings with Ultralow Sliding Angles Based on Silicone Nanofilaments", Angew Chemie International Edition, Jul. 11, 2011, vol. 50, No. 29, pp. 6652-6656.*

Junping Zhang et al: "Superoleophobic Coatings with Ultralow Sliding Angles Based on Silicone Nanofilaments", Angewandte Chemie International Edition, vol. 50, No. 29, Jul. 11, 2011 (Jul. 11, 2011), pp. 6652-6656.

Junping Zhang et al: "Universal self-assembly of organosilanes with long alkyl groups into silicone nanofilaments", Polymer Chemistry, vol. 5, No. 4, Jan. 1, 2014 (Jan. 1, 2014), p. 1132.

Junping Zhang et al: "Nepenthes Pitcher Inspired Anti-Wetting Silicone Nanofilaments Coatings: Preparation, Unique Anti-Wetting and Self-Cleaning Behaviors", Advanced Functional Materials, vol. 24, No. 8, Feb. 2, 2014 (Feb. 2, 2014), pp. 1074-1080.

Rongguo Chen et al: "Perfectly Hydrophobic Silicone Nanofiber Coatings: Preparation from Methyltrialkoxysilanes and Use as WaterCollecting Substrate", Journal of Physical Chemistry C, vol. 113, No. 19, May 14, 2009 (May 14, 2009), pp. 8350-8356.

Georg R Meseck et al: "Photocatalytic Composites of Silicone Nanofilaments and TiO2 Nanoparticles", Advanced Functional Materials, Wiley—V C H Verlag GMBH & Co. KGAA, DE, vol. 22, No. 21, Nov. 7, 2012 (Nov. 7, 2012), pp. 4433-4438.

* cited by examiner

LIQUID COATING COMPOSITIONS FOR USE IN METHODS FOR FORMING A SUPERHYDROPHOBIC, SUPEROLEOPHOBIC OR SUPERAMPHIPHOBIC LAYER

CROSS REFERENCE TO RELATED APPLICATIONS

This application is a National Stage of International Application No. PCT/EP2015/065140 filed Jul. 2, 2015, entitled "LIQUID COATING COMPOSITIONS FOR USE IN METHODS FOR FORMING A SUPERHYDROPHOBIC, SUPEROLEOPHOBIC OR SUPERAMPHIPHOBIC LAYER", which claims priority to European Application 14175443.2 filed Jul. 2, 2014, all of which are hereby incorporated by reference in their entirety.

TECHNICAL AREA

The present invention relates to liquid coating compositions for forming superhydrophobic, superoleophobic or superamphiphobic layers and suitable methods for imparting said properties on surfaces, and to substrates obtained by carrying out such method.

BACKGROUND

Inspired by self-cleaning materials in nature such as the lotus leaf or the leg of the water strider, the development of man-made superhydrophobic surfaces which display water contact angles in excess of 160°, has been investigated in the context of multiple applications.

In particular, coatings on the basis of different poly (siloxanes), known colloquially as silicone, which are "grown" directly on the surface of the substrates from silane monomers by gas phase deposition, have been the subject of multiple publications. Within this technical field, chemical vapour deposition (CVD) has been used as the method of choice for imparting superhydrophobicity, superoleophobicity or superamphiphobicity to substrates such as silicon wafers, glass, textiles and a plethora of other substrates.

For example, EP 1 644 450 A1 discloses compositions for coating comprising at least one silane compound bearing 2 or 3 hydrolysable groups, which are capable of forming a superhydrophobic coating on a substrate. While most of the compositions are applied via chemical vapour deposition at atmospheric pressure, EP 1 644 450 A1 discloses that the coating may be also achieved in a solution wherein a clean and optionally activated substrate is immersed, while stirring said solution comprising the dissolved, unreacted silane reactants in an aprotic solvent, such as toluene. The substrate is then left for 3 to 4 hours in said solution until silane reactants hydrolyse and polymerise into silicone nanofilaments (SNFs) in situ on the surface of the substrate. Stated alternatively, the coating is "grown" in situ on the surface of the substrate.

U.S. Pat. No. 8,067,065 B2 discloses a method for depositing fibrillar, nanotextured coatings on substrates by contacting the substrate with a reaction mixture comprising a hydrolysable silane-based reagent to produce a nanotextured surface on said substrate. The silane reagent can be comprised in a first solvent such as toluene and is applied to the substrate including a small amount of hydrolysing agent such as water in the reaction mixture. However, this method requires contacting the substrate with the unreacted reaction mixture comprising monomeric silane reagents and "growing" the reaction product i.e. the fibrillar, nanotextured, coating on said substrate. In order to do this, the water content must be carefully controlled to "grow" the fibrillar, nanotextured coating on top of the substrate. For this reason, the substrate needs to be completely immersed in a reaction mixture which is contained in a hermetically closed reaction vessel.

Most of these methods yield silicone coatings on substrates that are perfectly transparent and self-cleaning, which are desirable properties in multiple applications.

However, a disadvantage of chemical vapour deposition techniques and the aforementioned immersion techniques is that the substrate to be coated must be inserted into a container that is either a controlled atmosphere container in the case of CVD or a container large enough to hold an amount of the coating solution to fully immerse the substrate in.

While theoretically, any apparatus for CVD and/or dipping can be adapted to a given size, this becomes impractical at a certain scale. For instance, in the case of large objects or objects that are immobilized in their surroundings, such as masonry or windows of a building, there is no practical way to impart superhydrophobic, superoleophobic or superamphiphobic properties in situ by chemical vapour deposition and/or dipping unless the building is encased in a suitable container. Because of the extensive time period silicone nanofilaments need to grow on a substrate (in the order of several hours), it is not practical to apply a coating composition comprising the free silane reactants to a substrate, since both silane and/or solvents will evaporate before a filament can be achieved.

A further disadvantage of both CVD and and/or dipping techniques is that the substrate is in direct contact with an acidicmedium, i.e. a gas mixture or an organic solvent with acid to promote the polymerization on the substrate's surface. This problem is further exacerbated when using halogenated silane monomers such as for example trichloromethyl silane, which form even more hydrochloric acid during the condensation reaction.

Furthermore, the sole way the growing particles can be fixed to the substrate in both CVD and and/or dipping techniques are by covaltly linking the particles to the substrate.

Because of this, it is desirable to provide an alternative method for imparting super hydrophobic, superoleophobic, or superamphophobic properties to a substrate which can be performed irrespective of the dimensions of the substrate and which does not need prolonged exposure to the coating composition in order to achieve a silicone nano filament structure on its surface.

SUMMARY OF THE INVENTION

The present invention provides for method for forming a superhydrophobic, superoleophobic or superamphiphobic layer and imparting said property on a surface, comprising the steps of a. preparing a liquid coating composition comprising a solvent and dispersed silicone nanoparticles, preferably in an amount of from 0.01% to 40% by weight, based on the total weight of the liquid coating composition, b. optionally priming the surface to form a primed surface on which a superhydrophobic, superoleophobic or superamphiphobic layer is to be formed, c. applying a layer of the liquid coating composition on the surface or primed surface on which the superhydrophobic, superoleophobic or superamphiphobic layer is to be formed, d. evaporating the solvent from the liquid coating composition to form a superhydrophobic, superoleophobic or superamphiphobic layer and impart said property on the surface or primed surface, wherein the dispersed silicone nanoparticles are formed by polymerization of at least one compound of formula I in an aprotic solvent comprising 5 to 500 ppm, preferably 60 to 250 ppm, more preferably 75 to 150 ppm, of water,

wherein $R_a$ is a straight-chain or branched C(1-24) alkyl or alkenyl group, an aromatic group which is linked by a single covalent bond or linked by a straight-chain or branched alkylene unit having 1 to 8 carbon atoms, to the Si-atom, $R_1$ a straight chain or a branched hydrocarbon radical having 1 to 6 carbon atoms,
$X_1$ is a hydrolysable group, which is one or more of a halogen or an alkoxy group, and
n is 0 or 1, and preferably is 0.

The present invention moreover provides for a liquid coating composition for forming a superhydrophobic, superoleophobic or superamphiphobic layer and imparting said property on a surface, comprising a solvent and dispersed silicone nanoparticles, preferably in an amount of from 0.01% to 40% by weight based on the total weight of the liquid coating composition, wherein the dispersed silicone nanoparticles are formed by polymerization in an aprotic solvent, preferably toluene, comprising 5 to 500 ppm, preferably 60 to 250 ppm water of at least one compound of formula I

wherein $R_a$ is a straight-chain or branched C(1-24) alkyl or alkenyl group, an aromatic group which is linked by a single covalent bond or linked by a straight-chain or branched alkylene unit having 1 to 8 carbon atoms, to the Si-atom, $R_1$ a straight chain or a branched hydrocarbon radical having 1 to 6 carbon atoms,
$X_1$ is a hydrolysable group, which is one or more of a halogen or an alkoxy group, and
n is 0 or 1, and preferably is 0.

The present invention also provides for a layer obtainable according to the above described method, comprising silicone nanoparticles in the form of nanofilaments or nanotubes having a diameter of from 45 to 100 nm, preferably in the form of nanofilaments having a concatenated beads-type morphology.

The present invention further provides for a coated article comprising a substrate and a coating comprising an outer superhydrophobic, superoleophobic or superamphiphobic layer according to the above description, and an optional intermediate primer layer.

Further preferred embodiments are laid down in the dependent claims and description.

SHORT DESCRIPTION OF THE DRAWINGS

Preferred embodiments of the invention are described below with reference to the drawings, which shall serve merely for illustration purposes and are not limiting. In the drawings.

DESCRIPTION OF PREFERRED EMBODIMENTS

Figure 1:
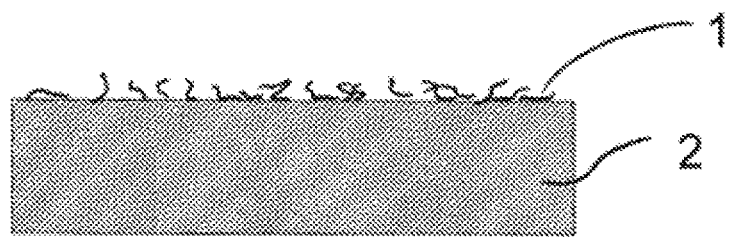
FIG. 1 shows the top surface of a substrate (2) coated with silicone nanoparticles (1) which were applied through a liquid coating composition consisting of silicone nanoparticles (1) and a solvent.
Figure 2:
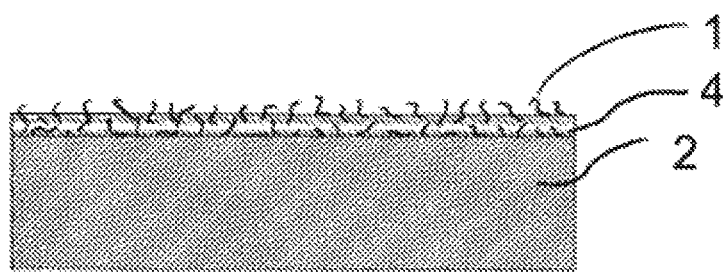
FIG. 2 shows the top surface of a substrate (2) coated with of silicone nanoparticles (1), in which silicone nanoparticles (1) are dispersed within a layer of synthetic matrix resin (4). In this case, the liquid coating composition consisted of silicone nanoparticles (1), a synthetic matrix resin (4) and a solvent.
Figure 3:
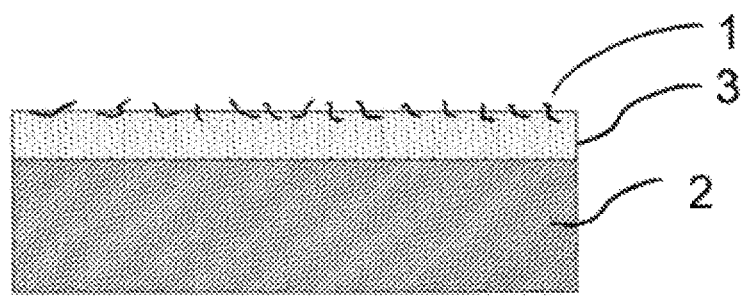
FIG. 3 shows the top surface of a substrate (2) coated with silicone nanoparticles (1), in which silicone nanoparticles (1) are partially enclosed in the layer of synthetic primer resin (3). In this case, the liquid coating composition consisted of silicone nanoparticles (1) and a solvent, and the liquid primer composition consisted of a synthetic primer resin (3) and a solvent.

In the context of the present invention, the term "superhydrophobic layer" refers to a layer which exhibits a water droplet contact angles in excess of 150°, when measured through optical contact angle using 5 ul water droplets at 25° C. and 100 kPa on a OCA 20 instrument by Datapysics (Filderstadt/Germany) running the SCA 20 software.

In the context of the present invention, the term "superoleophobic layer" refers to a layer which exhibits a cyclohexane droplet contact angles in excess of 150°, when measured through optical contact angle using 5 ul cyclohexane droplets at 25° C. and 100 kPa on a OCA 20 instrument by Datapysics (Filderstadt/Germany) running the SCA 20 software.

In the context of the present invention, the term "superamphiphobic layer" refers to a layer which exhibits contact angles in excess of 150° for both water and cyclohexane droplets, when measured through optical contact angle using 5 ul droplets at 25° C. and 100 kPa on a OCA 20 instrument by Datapysics (Filderstadt/Germany) running the SCA 20 software.

In the context of the present invention, the term "aprotic solvent" includes polar and non-polar aprotic solvents.

In the context of the present invention, the term "nanoparticles" means particles having at least one dimension of less than 200 nm, preferably of less than 100 nm.

In the context of the present invention, the term "straight-chain or branched C(1-24) alkyl group" includes preferably straight chain and branched hydrocarbon radicals having 1 to 16, more preferably 1 to 12, more preferably 1 to 8 carbon atoms and most preferred 1 to 4 carbon atoms, such as methyl, ethyl, n-propyl, isopropyl, n-butyl and isobutyl groups.

In the context of the present invention, the term "aromatic" includes optionally substituted carbocyclic and heterocyclic groups comprising five-, six- or ten-membered ring systems, such as furane, phenyl, pyridine, pyrimidine, or naphthalene, preferably phenyl, which are unsubstituted or substituted by an optionally substituted lower alkyl group, such as methyl, ethyl or trifluoromethyl, a halogen, such as fluoro, chloro, bromo, preferably chloro, a cyano or nitro group.

In the context of the present invention, the term "spacer unit" includes a straight-chain or branched alkylene residue, having 1 to 8 carbon atoms, preferably 1 to 6, more preferably 1, 2 or 3 carbon atoms.

In the context of the present invention, the term "lower alkyl" includes straight chain and branched hydrocarbon radicals having 1 to 6 carbon atoms, preferably 1 to 3 carbon atoms. Methyl, ethyl, propyl and isopropyl groups are especially preferred.

In the context of the present invention, the term "hydrolysable group" includes a halogen, such as fluoro or chloro, preferably chloro, or an alkoxy group, such as a straight chain and branched hydrocarbonoxy radical having 1 to 6 carbon atoms, preferably 1 to 3 carbon atoms, wherein methoxy, ethoxy, propoxy and isopropoxy groups are especially preferred.

The present invention provides for method for forming a superhydrophobic, superoleophobic or superamphiphobic layer and imparting said property on a surface, comprising the steps of a. preparing a liquid coating composition comprising a solvent and dispersed silicone nanoparticles, preferably in an amount of from 0.01% to 40% by weight based on the total weight of the liquid coating composition, b. optionally priming the surface to form a primed surface on which a superhydrophobic, superoleophobic or superamphiphobic layer is to be formed, c. applying a layer of the liquid coating composition on the surface or primed surface on which the superhydrophobic, superoleophobic or superamphiphobic layer is to be formed, d. evaporating the solvent from the liquid coating composition to form a superhydrophobic, superoleophobic or superamphiphobic layer and impart said property on the surface or primed surface,
wherein the dispersed silicone nanoparticles are formed by polymerization of at least one compound of formula I in an aprotic solvent comprising 5 to 500 ppm, preferably 60 to 250 ppm, more preferably 75 to 150 ppm, of water,

$$R_aSi(R_1)_n(X_1)_{3-n} \quad (I)$$

wherein $R_a$ is a straight-chain or branched C(1-24) alkyl or alkenyl group, an aromatic group which is linked by a single covalent bond or linked by a straight-chain or branched alkylene unit having 1 to 8 carbon atoms, to the Si-atom,
$R_1$ a straight chain or a branched hydrocarbon radical having 1 to 6 carbon atoms,
$X_1$ is a hydrolysable group, which is one or more of a halogen or an alkoxy group, and
n is 0 or 1, and preferably is 0.

In a particularly preferred embodiment, the dispersed silicone nanoparticles are formed by polymerization of at least one compound of formula I in an aprotic solvent comprising 5 to 500 ppm, preferably 60 to 250 ppm, more preferably 75 to 150 ppm of water,

$$R_aSi(R_1)_n(X_1)_{3-n} \quad (I)$$

wherein $R_a$ is a straight-chain or branched C(1-24) alkyl or alkenyl group, an aromatic group which is linked by a single covalent bond or linked by a straight-chain or branched alkylene unit having 1 to 8 carbon atoms, to the Si-atom,
$X_1$ is a one or more of a halogen or an alkoxy group, preferably a halogen chosen from Cl, Br, I or F; and n is 0.

A suitable aprotic solvent for the synthesis of the silicone nanoparticles dispersed in the liquid coating composition can be for example (cyclo)pentane, (cyclo)hexane, 1,4-dioxane, benzene, diethyl ether, chloroform, toluene, dichloromethane, tetrahydrofuran, ethyl acetate, acetone, dimethylformamide acetonitrile, dimethylsulfoxide or mixtures thereof. Preferably, the aprotic solvent is toluene or benzene.

A suitable solvent for use in the liquid coating composition and/or the liquid priming composition can be any protic or aprotic solvent. In a preferred embodiment, the solvent comprised in the liquid coating composition is a protic solvent that is environmentally friendly, such as an alcohol chosen from straight-chain or branched C (1-5) alcohols, or mixtures thereof. Exemplary alcohols are methanol, ethanol, n-propanol, isopropanol, or mixtures thereof.

It should be borne in mind that both the aprotic solvent for polymerisation and the solvent for dispersion should be solvents that are incapable of solvating the silicone nanoparticles. For instance, it is possible to disperse the silicone nanoparticles in the same solvent as the solvent used for the polymerisation thereof, even though an environmentally preferred embodiment is constituted by the use of a protic solvent such as an alcohol in the liquid coating and priming compositions.

The method according the present invention for forming a superhydrophobic, superoleophobic or superamphiphobic layer on a surface allows conferring the aforementioned properties to a surface of a substrate, which layer will, in addition to being superhydrophobic, superoleophobic or superamphiphobic also display absolute optical transparency and moreover will be self-cleaning. Thus it is also an embodiment of the present invention to provide for a method for forming a superhydrophobic, superoleophobic or superamphiphobic, optically transparent and/or self-cleaning layer and imparting said properties on a surface.

The liquid coating composition may comprise the dispersed silicone nanoparticles in an amount of from 0.001% to 40% by weight based on the total weight of the liquid coating composition, preferably of from 0.05% to 15% or even more preferably of from 0.1% to 5%.

In one particular embodiment, the present invention provides for a method for forming a superhydrophobic layer and imparting said property on a surface, in which case the dispersed silicone nanoparticles that are formed by polymerization of at least one compound of formula I can be used as-is, i.e. without further functionalization of the obtained superhydrophobic silicone nanoparticles.

In another particular embodiment, the present invention provides for method for forming a superoleophobic layer and imparting said property on a surface, in which case the dispersed silicone nanoparticles that are formed by polymerization of at least one compound of formula I are further functionalized after polymerisation by a) isolating the obtained silicone nanoparticles, b) activating the obtained silicone nanoparticles using oxygen plasma treatment and c) subsequently reacting the activated silicone nanoparticles with a fluorinating agent, preferably a silane-based fluorinating agent such as for example perfluoroalkylsilanes such as perfluorinated derivatives of di- or tri-halogenosilanes or perfluorinated derivatives of di- or tri-alkoxysilanes. The thus obtained superoleophobic silicone nanoparticles can then be re-dispersed in a suitable solvent to yield a liquid coating composition suitable for forming a superoleophobic layer and impart said property on a surface. Methods of modifying superhydrophobic silicone nanoparticles into superoleophobic silicone nanoparticles are known in the state of the art, and a person skilled in the art will readily be able to perform such modifications. As an exemplary publication, the work by Zhang, S. Seeger: Superoleophobic Coatings with Ultra-low Sliding Angles Based on Silicone Nanofilaments, Angewandte Chemie, Int. Ed. 50, 6652-6656 (2011) may be mentioned.

In yet another particular embodiment, the present invention provides for method for forming a superamphiphobic layer and imparting said property on a surface, in which case a blend of functionalized and unfunctionalized silicone nanoparticles may be used.

In a preferred embodiment, the dispersed silicone nanoparticles are formed by polymerization, and during the polymerisation reaction the molar ratio between the at least one compound of formula I and water is in excess of 1, preferably between 2:1 and 1:1, more preferably between 1.5:1 and 1:1.

In another preferred embodiment, the method further comprises the step of e. thermally annealing the formed superhydrophobic, superoleophobic or superamphiphobic layer at a temperature of from 70° to 500° C., with the proviso that that the temperature at which the thermal annealing step is performed is not detrimental to the surface material. Preferably the thermal annealing step is performed at a temperature of from 100 to 450° C., more preferably at a temperature of from 120 to 400 ° C., even more preferably at a temperature of from 150° to 350° C. for at least 0.5 hour, most preferably to a temperature of from 180° C. to 300° C. for at least 0.5 hour or of from 1 hour to 3 hours. Thermal annealing allows a further increase in the superhydrophobic, superoleophobic or superamphiphobic properties of the formed superhydrophobic, superoleophobic or superamphiphobic layer.

In yet another preferred embodiment, the silicone nanoparticles comprised in the liquid coating composition are in the form of nanofilaments or nanotubes having a diameter of from 45 to 100 nm, preferably in the form of nanofilaments having concatenated beads-type morphology.

In a further preferred embodiment, step b. of priming the surface where superhydrophobic, superoleophobic or superamphiphobicity is to be imparted to form a primed surface comprises the step of applying a layer of a liquid priming composition comprising a solvent and a synthetic primer resin, capable of forming a primer layer upon evaporation of the solvent. In the case the method includes the step of priming the surface, the liquid coating composition is preferably applied before the totality of the solvent of the liquid priming composition has evaporated. By doing so, the liquid coating composition is applied to a liquid priming composition that has not yet fully dried and which still has residual tackiness. This allows the silicone nanoparticles in the liquid coating composition to at least partially "sink into" the not yet fully dried liquid priming composition. More preferably, the solvent of both the liquid priming composition and the liquid coating composition are the same in order to prolong the tackiness of liquid priming composition.

In yet a further preferred embodiment, the liquid coating composition further comprises a synthetic matrix resin capable of forming a matrix layer upon evaporation of the solvent. The inclusion of a synthetic matrix resin allows obtaining a superhydrophobic, superoleophobic or superamphiphobic layer in which the dispersed silicone nanoparticles are surrounded by a matrix of synthetic resin, which confers excellent abrasion properties to the superhydrophobic, superoleophobic or superamphiphobic layer and allows to hold the silicone nanoparticles in place. If a coated substrate is subjected to abrasion, the superhydrophobic, superoleophobic or superamphiphobic properties will be maintained since the abrasion will reveal new dispersed silicone nanoparticles that are lodged in synthetic resin matrix.

In an additional preferred embodiment, the synthetic primer resin and the synthetic matrix resin are chosen from resins that are soluble in the solvent of the liquid coating composition or the solvent of the liquid priming composition such as acrylic, alkyd or phenolic resins, fluorinated resins, polyolefins, polyesters, polyamides, polyurethanes and mixtures thereof.

In another additional preferred embodiment, the aprotic solvent, the solvent of the liquid priming composition and the solvent of the liquid coating composition are the same, and preferably are toluene.

In yet another additional preferred embodiment the liquid coating composition and if present the liquid priming composition, is applied by pneumatic atomization of the composition, by dip coating in the composition, by paint roller or tampon, by electrostatic spraying, by thermal spraying, or inkjet printing. In the case where $R_a$ is a straight-chain or branched C(1-24) alkenyl group, preferably when the $R_a$ is a vinyl group, the liquid coating composition is advantageously subsequently cured by radiation such as UV or electron beam, since the unsaturated groups can cross-link with the synthetic matrix resin to further increase the bond at the interface of silicone nanoparticles and synthetic matrix composition.

In yet another additional preferred embodiment, the superhydrophobic, superoleophobic or superamphiphobic layer has a surface roughness of less than 500 nm when measured with atomic force microscope.

In an equally preferred embodiment, the at least one compound of formula I is chosen from trichloromethylsilane (TCMS), trichloroethylsilane, trichloro(n-propyl)silane, trichloroethylsilane, trichlorovinylsilane, trichlorophenylsilane, trimethoxymethylsilane and triethoxymethylsilane, and mixtures thereof, and is preferably chosen from trimethoxymethylsilane and triethoxymethylsilane, and mixtures thereof.

In the case where superhydrophobicity, superoleophobicity or superamphiphobicity is to be imparted on an acid-sensitive surface, it is preferred to use alkoxysilanes, such as methyltriethoxysilane, (3-phenylpropyl)-methyldimethoxysilane or (3-phenylpropyl)-methyldiethoxysilane, to avoid the formation of hydrochloric acid during hydrolysis of the silanes with water molecules in the liquid coating composition.

The present invention also provides for a layer obtainable according to the above described method, comprising silicone nanoparticles in the form of nanofilaments or nanotubes having a diameter of from 45 to 100 nm, preferably in the form of nanofilaments having a concatenated beads-type morphology.

In a preferred embodiment, the silicone nanoparticles in the superhydrophobic, superoleophobic or superamphiphobic layer are dispersed within a synthetic resin chosen from acrylic or phenolic resins, fluorinated resins, polyolefins, polyesters, polyamides, polyurethanes and mixtures thereof. Alternatively, in the case where the liquid coating composition does not comprise a synthetic matrix resin, the silicone nanoparticles may be partially in direct contact with the synthetic primer resin.

The present invention further provides for a coated article comprising a substrate and a coating comprising an outer superhydrophobic, superoleophobic or superamphiphobic layer according to the above description, and an optional intermediate primer layer.

In a preferred embodiment, the substrate of the coated article is chosen from wood, glass, stone, minerals, silicon, metal or alloys thereof, polymer or alloys thereof, textiles, woven or non-woven fabrics, and ceramic or the optional intermediate primer layer is chosen from a synthetic resin chosen from acrylic, alkyd or phenolic resins, fluorinated resins, polyolefins, polyesters, polyamides, polyurethanes and mixtures thereof. The substrate can be in the form of a porous substrate such as foam; for example ceramic, metal, polymer, glass, stone, mineral, silicon, foams can be coated not only on their exterior but also the inside walls of the pores can be coated. In porous substrates, the method of the present invention is especially advantageous since the liquid priming and coating compositions can enter into the pores of the porous substrate and deposit the silicon nanoparticles inside. In contrast, a method including CVD deposition cannot reach far into the interior pores of foam because there are limits to diffusion of the gaseous silane monomers. Other porous materials include paper, cardboard, felts, wood and wood composites.

Exemplary primer layers that are commercially available are paints, glazes or lacquers, in particular glazes for preservation of wooden structures comprising synthetic resins and a wood preserving agent.

In a more preferred embodiment, the optional intermediate primer layer is chosen from glazes for preservation of wooden structures comprising a fatty acid-modified polyester resin (known as alkyd resins) and a wood preserving agent. The combination of such a glaze with the liquid coating composition yields an exceptionally strong anti-fouling effect on wooden substrates.

In another more preferred embodiment, the optional intermediate primer layer is chosen from automotive paints or coatings. The combination of such an automotive paint or coating with the liquid coating composition yields automotive paints or coatings having strong superhydrophobic, superoleophobic or superamphiphobic properties without losing any of the desirable gloss of such paints or coatings since the size of the silicone nanoparticles is less than the wavelength of light.

The present invention moreover provides for a liquid coating composition for forming a superhydrophobic, superoleophobic or superamphiphobic layer and imparting said property on a surface, comprising a solvent and dispersed silicone nanoparticles, preferably in an amount of from 0.01% to 40% by weight based on the total weight of the liquid coating composition, wherein the dispersed silicone nanoparticles are formed by polymerization in an aprotic solvent, preferably toluene, comprising 5 to 500 ppm, preferably 60 to 250 ppm water of at least one compound of formula I $$R_aSi(R_1)_n(X_1)_{3-n} \quad (I)$$

wherein $R_a$ is a straight-chain or branched C(1-24) alkyl or alkenyl group, an aromatic group which is linked by a single covalent bond or linked by a straight-chain or branched alkylene unit having 1 to 8 carbon atoms, to the Si-atom, $R_1$ a straight chain or a branched hydrocarbon radical having 1 to 6 carbon atoms,
$X_1$ is a hydrolysable group, which is one or more of a halogen or an alkoxy group, and
n is 0 or 1, and preferably is 0.

In a preferred embodiment, the silicone nanoparticles of the liquid coating composition are formed by polymerization and the molar ratio between the at least one compound of formula I and water is in excess of 1, preferably between 2:1 and 1:1.

In another preferred embodiment, the silicone nanoparticles of the liquid coating composition are silicone nanoparticles that are in the form of nanofilaments or nanotubes having a diameter of from 45 to 100 nm, preferably in the form of nanofilaments having a concatenated beads-type morphology.

In yet another preferred embodiment, the liquid coating composition further comprises a synthetic matrix resin capable of forming a matrix layer upon evaporation of the solvent and preferably the synthetic matrix resin is chosen from the group of acrylic, alkyd or phenolic resins, fluorinated resins, polyolefins, polyesters, polyamides, polyurethanes and mixtures thereof, and more preferably is an acrylic, alkyd or phenolic resin. In another preferred embodiment, the synthetic matrix resin capable of forming a matrix layer upon evaporation of the solvent can be a silicone resin.

In an additional preferred embodiment, the silicone nanoparticles of the liquid coating composition are silicone nanoparticles are formed by polymerization of least one compound of formula I chosen from trichloromethylsilane (TCMS), trichloroethylsilane, trichloro(n-propyl)silane, trimethoxymethylsilane and triethoxymethylsilane, and mixtures thereof.

EXPERIMENTS

TCMS

Silicone nanoparticles were synthesized by preparing 2000 ml of toluene having a water content in to 115 ppm and adding 0.15% by volume of trichloromethylsilane (TCMS) to the reaction mixture. The reaction mixture was left to react under constant stirring overnight. After the reaction had completed, the toluene was removed by evaporation and a whitish powder was isolated. The obtained powder was ground in a mortar and re-dispersed in a suitable solvent to yield a dispersion of silicone nanoparticles in solvent.

A 1% by weight silicone nanoparticle dispersion in toluene was prepared by adding 0.87 grams of the obtained silicone nanoparticle powder in 68 grams of toluene. Analogously, a 1% by weight dispersion of silicone nanoparticles in ethanol was obtained by adding 0.79 grams of the obtained silicone nanoparticle powder in 79 grams of ethanol.

The obtained dispersions were subsequently tested for their ability to impart superhydrophobic properties to metal plates. To this end, the dispersions were loaded into a pressurized spray pistol operating at 3.5 to 4 bars of pressure to be uniformly applied to the tested metal plates. Each metal plate was coated and then evaluated by measuring contact angles and sliding angles in triplicate. After the initial assessment of contact angles and sliding angles, the coated metal plates were thermally annealed at 200° C. for 2.5 hours and the contact angles and sliding angles were recorded in duplicate. Results are summarized in Tables 1 and 2.

TABLE 1

| | 1% by weight in Toluene | | | |
|---|---|---|---|---|
| | Contact angle | Sliding angle | Contact angle | Sliding angle |
| Sample 1 | 164.5 | 1 | / | / |
| | 163.6 | 7 | 165.5 | 1 |
| | 171.2 | 1 | drop would'nt stay on plate | 0 |
| Sample 2 | 174.1 | 18 | / | / |
| | 165.1 | 12 | 166.7 | 3 |
| | 173.3 | 20 | 165.4 | 3 |

TABLE 2

| | Contact angle | Sliding angle | Contact angle | Sliding angle |
|---|---|---|---|---|
| 1% by weight in Ethanol | | | | |
| Sample 3 | 179.7 | 4 | 167.2 | 1 |
| | 162.9 | 4 | 169.5 | 2 |
| | 144.9 | >90 | / | / |
| Sample 4 | 161.9 | >90 | 171.4 | 1 |
| | 164 | 4 | 196.1 | 1 |
| | 160.8 | 60 | / | / |

As can be seen from the results, contact angles are mostly in excess of 160°, and sliding angles topped out at 3°. Without wishing to be bound to any theory, it is believed that the high values contact angles and low values of sliding angles are attributable to a change from Wenzel to a Cassie-Baxter regime, in which the water droplet is unable to wet the surface of the treated metal plate.

ETCS 1

Silicone nanoparticles were synthesized by preparing 2000 ml of toluene having a water content of 110 ppm and adding 3 mL (22.7 mmol) of ethyltrichlorosilane (ETCS) to the reaction mixture. The reaction mixture was left to react under constant stirring for 14 hours. After the reaction had completed a grey haze could be seen at the bottom of the reaction vessel, the toluene was removed by first filtering through a funnel filter (Pore N° 5) and subsequent evaporation of residual toluene for about 4 hours. A whitish powder was isolated and weighted. The 49.2 mg of the obtained powder indicated a yield of 2% under the assumption of complete condensation. The optical analysis of the formed filaments indicated a diameter in the range of 80-100 nm and a length in the range of several micrometres

ETCS 2

Silicone nanoparticles were synthesized by preparing 2000 ml of toluene having a water content of 110 ppm and adding 2 mL (15.1 mmol) of ethyltrichlorosilane (ETCS) to the reaction mixture. The reaction mixture was left to react under constant stirring for 7 hours. After the reaction had completed a grey haze could be seen at the bottom of the reaction vessel, and the toluene was removed by first filtering through a funnel filter (Pore N° 5) and subsequent evaporation of residual toluene overnight. A whitish powder was isolated and weighted. The 30.4 mg of the obtained powder indicated a yield of 1.9% under the assumption of complete condensation. The optical analysis of the formed filaments indicated a diameter in the range of 80-100 nm and a length in the range of several micrometres.

PTCS

Figure 4:
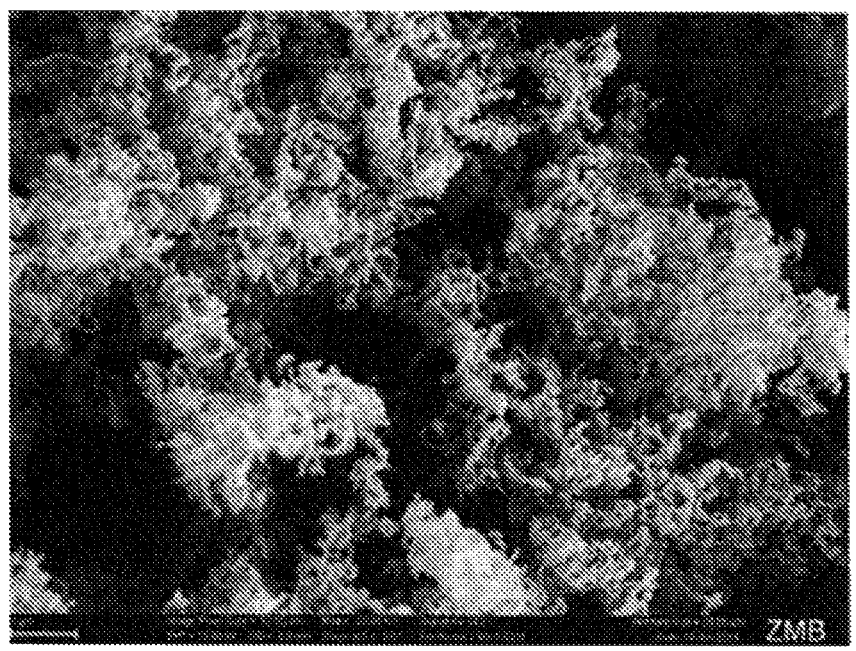
FIG. 4 shows microscopic analysis of the formed filaments indicating a diameter in the range of 80—100 nm and a length in the range of several micrometres.

Silicone nanoparticles were synthesized by preparing 2000 ml of toluene having a water content of 110 ppm and adding 3 mL (18.72 mmol) of phenyltrichlorosilane (PTCS) to the reaction mixture. The reaction mixture was left to react under constant stirring for 14 hours. After the reaction had completed a grey haze could be seen at the bottom of the reaction vessel, and the toluene was removed by first filtering through a funnel filter (Pore N° 5) and subsequent evaporation of residual toluene for 4 hours. A whitish powder was isolated and weighted. The 19 mg of the obtained powder indicated a yield of 0.8% under the assumption of complete condensation. The optical analysis of the formed filaments indicated a diameter in the range of 80-100 nm and a length in the range of several micrometres. The microscopic analysis of the formed filaments indicated a diameter in the range of 80-100 nm and a length in the range of several micrometres and are shown in FIG. 4

VTCS

Figure 5:
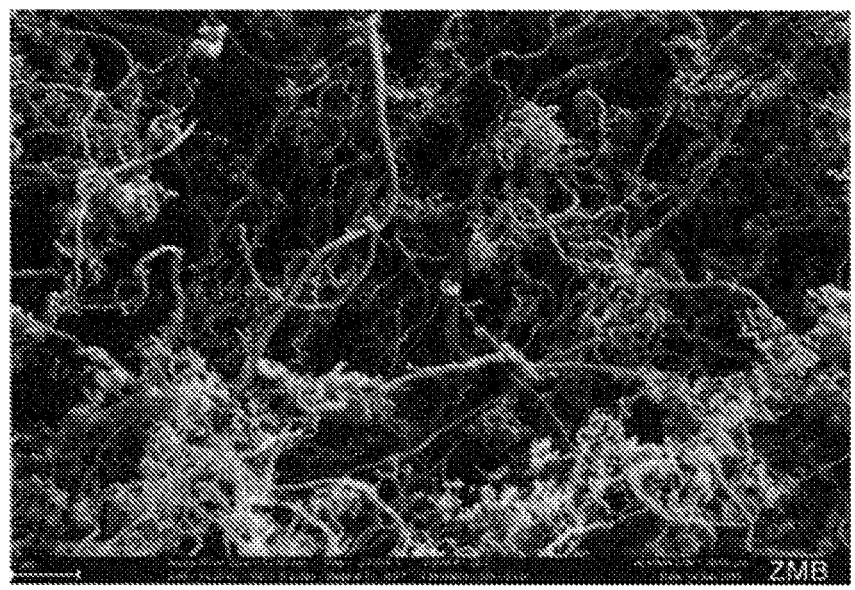
FIG. 5 shows microscopic analysis of the formed filaments indicating a diameter in the range of 80—100 nm and a length in the range of several micrometres.

Silicone nanoparticles were synthesized by preparing 2000 ml of toluene having a water content of 110 ppm and adding 3 mL (23.59 mmol) of vinyltrichlorosilane (VTCS) to the reaction mixture. The reaction mixture was left to react under constant stirring for 14 hours. After the reaction had completed a grey haze could be seen at the bottom of the reaction vessel, and the toluene was removed by first filtering through a funnel filter (Pore N° 5) and subsequent evaporation of residual toluene for 4 hours. A whitish powder was isolated and weighted. The 58 mg of the obtained powder indicated a yield of 3% under the assumption of complete condensation. The microscopic analysis of the formed filaments indicated a diameter in the range of 80-100 nm and a length in the range of several micrometres and are shown in FIG. 5.

The obtained powders from experiments showed superhydrophobic behaviour when contacted with water and were shown to be very resistant against strong acids. Contacting the powder with sulphuric acid (conc.), nitric acid (conc.), or chromic-sulphuric acid for more than 18 hours did not affect the superhydrophobic properties of the powder or the morphology thereof. An analysis of the various powders obtained, by Scanning Electron Microscope (SEM), Transmission Electron Microscopy (TEM) and Energy Dispersive X-ray Spectroscopy (EDX) confirmed that the powder consists essentially of silicone nanofilaments, and images of powders obtained in particular from PTCS and VTCS are shown in FIGS. 4 and 5, respectively.

LIST OF REFERENCE SIGNS

| 1 | Silicon nanoparticles |
|---|---|
| 2 | Substrate |
| 3 | Synthetic primer resin |
| 4 | Synthetic matrix resin |

The invention claimed is:

1. A method for forming a superhydrophobic, superoleophobic or superamphiphobic layer and imparting said properties on a surface, comprising the steps of
   a. polymerizing, in an aprotic solvent comprising 5 to 500 ppm water, at least one compound of formula I $$R_aSi(R_1)_n(X_1)_{3-n} \quad (I)$$

and
   isolating a powder of silicone nanoparticles by evaporating and/or filtering off the aprotic solvent;
   wherein Ra is a C(1-2) alkyl group, a straight-chain or branched C(3-24) alkyl or alkenyl group, an aromatic group which is linked by a single covalent bond or linked by a straight-chain alkylene unit having 2 to 8 carbon atoms or branched alkylene unit having 3 to 8 carbon atoms, to the Si-atom,
   R1 is a C(1-2) hydrocarbon radical, or a straight chain or a branched hydrocarbon radical having 3 to 6 carbon atoms,
   $X_1$ is a hydrolysable group, which is one or more of a halogen or an alkoxy group, and
   n is 0 or 1,
   b. preparing a liquid coating composition comprising a solvent and the silicone nanoparticles, c. optionally priming the surface to form a primed surface on which a superhydrophobic, superoleophobic or superamphiphobic layer is to be formed, d. applying a layer of the liquid coating composition on the surface or primed surface on which the superhydrophobic, superoleophobic or superamphiphobic layer is to be formed, and e. evaporating the solvent from the liquid coating composition to form a superhydrophobic, superoleophobic or superamphiphobic layer and impart said property on the surface or primed surface.

2. The method according to claim 1, wherein the molar ratio between the at least one compound of formula I and water is in excess of 1.

3. The method according to claim 1, wherein it further comprises the step of
thermally annealing the superhydrophobic, superoleophobic or superamphiphobic layer at a temperature of from 70° to 500° C.

4. The method according to claim 1, wherein the silicone nanoparticles are in the form of nanofilaments having a diameter of from 45 to 100 nm, or nanotubes having a diameter of from 45 to 100 nm.

5. The method according to claim 1, wherein optionally priming the surface comprises applying a layer of a synthetic primer resin.

6. The method according to claim 1, wherein the liquid coating composition further comprises a synthetic matrix resin capable of forming a matrix layer upon evaporation of the solvent.

7. The method according to claim 5, wherein the solvent in the liquid coating composition is chosen from environmentally friendly protic solvents or mixtures thereof.

8. The method according to claim 5, wherein liquid coating composition is applied by pneumatic atomization of the composition, by dip coating in the composition, by paint roller or tampon, by electrostatic spraying, by thermal spraying, or inkjet printing and is subsequently cured by radiation in the case where $R_a$ is a C(2) alkenyl group or is a straight-chain or branched C(3-24) alkenyl group.

9. The method according to claim 1, wherein the at least one compound of formula I is chosen from trichloromethylsilane (TCMS), trichloroethylsilane, trichloro(n-propyl) silane, trimethoxymethylsilane and triethoxymethylsilane, and mixtures thereof.

10. The method according to claim 1, wherein the silicone nanoparticles are comprised in the liquid coating composition in an amount of from 0.01% to 40% by weight or wherein the aprotic solvent comprises 60 to 250 ppm water or wherein the silicone nanoparticles are in the form of nanofilaments having a concatenated beads morphology or nanotubes having a concatenated beads morphology.

11. The method according to claim 1, wherein the molar ratio between the at least one compound of formula I and water is between 2:1 and 1:1.

12. The method according to claim 5, wherein the solvent in the liquid coating composition is chosen from C(1-2) alcohols, or straight-chain or branched C(3-5) alcohols and mixtures thereof or wherein in the compound of formula I, $R_a$ is a vinyl.

13. The method according to claim 1, wherein the superhydrophobic, superoleophobic or superamphiphobic layer comprises silicone nanoparticles in the form of nanofilaments having concatenated beads morphology.

* * * * *

UNITED STATES PATENT AND TRADEMARK OFFICE
CERTIFICATE OF CORRECTION

PATENT NO.         : 10,975,254 B2
APPLICATION NO.    : 15/323085
DATED              : April 13, 2021
INVENTOR(S)        : Stefan Seeger et al.

It is certified that error appears in the above-identified patent and that said Letters Patent is hereby corrected as shown below:

On the Title Page

Item (73), please replace "Silana GmbH, Zollikon (CH)" with --Silana GmbH, Zollikon (CH); Universitat Zurich, Zurich (CH)--

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*